United States Patent [19]

Varner, Jr. et al.

[11] Patent Number: 5,785,863

[45] Date of Patent: Jul. 28, 1998

[54] REMOVING METALS FROM AQUEOUS WASTE STREAMS

[75] Inventors: Thomas L. Varner, Jr., Wilmington, Ill.; William C. Hiatt, Hendersonville, N.C.; Thomas A. Hoermann, Toledo, Ohio

[73] Assignee: BASF Corporation, Mt. Olive, N.J.

[21] Appl. No.: 959,179

[22] Filed: Oct. 28, 1997

[51] Int. Cl.$^6$ .................................................. C02F 1/62
[52] U.S. Cl. ........................... 210/724; 210/729; 210/912
[58] Field of Search ................................. 210/729, 730, 210/724, 912

[56] References Cited

U.S. PATENT DOCUMENTS

| | | | |
|---|---|---|---|
| 3,158,570 | 11/1964 | Duke | 210/912 |
| 3,203,968 | 8/1965 | Sebba | 210/912 |
| 4,054,516 | 10/1977 | Izumi et al. | 210/912 |

*Primary Examiner*—Neil McCarthy
*Attorney, Agent, or Firm*—James J. Drake

[57] ABSTRACT

Methods of removing contaminant metals from aqueous waste streams. A preferred method includes providing an aqueous waste stream containing a metal having a valence of at least one, such as zinc, lead, chromium, copper, iron, aluminum, manganese, cadmium, gold, silver, and mixtures of these metals. The waste stream is substantially free of calcium and magnesium. The process also includes forming a substantially insoluble precipitate of said metal by mixing with the waste stream fatty acids; zinc, potassium, and sodium salts of fatty acids; and mixtures of these materials. The metal precipitate is separated from the waste stream and the water that is subject to the removal process remains substantially free of calcium and magnesium throughout the entire process. The methods of the present invention are particularly effective for the removal of trace amounts of zinc from aqueous waste streams from polystyrene processes.

18 Claims, No Drawings

REMOVING METALS FROM AQUEOUS WASTE STREAMS

FIELD OF THE INVENTION

The present invention relates to a method of removing metals from aqueous waste streams, particularly to a method of removing trace amounts of regulated metals, and more particularly to a method of removing metals from aqueous waste streams resulting from the manufacture of a resin, such as polystyrene.

BACKGROUND AND SUMMARY OF THE INVENTION

Water cooling baths are used in the manufacture of resins, such as polystyrene, to lower the temperature of the resin formed to below the melting point or glass transition temperature of the resin, for example, to cool such resins after extrusion. These cooling baths are continuously cooled and recirculated with small purge streams that control or reduce the level of solids and other components in the bath. Contaminants, such as polyvalent and monovalent metals, are generally present in these waste streams and will eventually be discharged to waste water treatment facilities unless removed. Government regulations for such waste water often result in a need for manufacturers to remove or reduce the concentration of the contaminants before discharging the waste water to treatment facilities.

Zinc stearate is commonly utilized in the manufacture of polystyrene resin as a die lubricant. During manufacture, molten polystyrene resin is extruded through die heads to form strands of the resin, which are then cooled to below the melt processing range of the resin in water cooling baths. The baths, however, accumulate undesirable solids, such as the zinc stearate lubricant, that may affect the quality of the resin product. Upon entering the cooling baths, zinc stearate may also dissociate in water, leaving zinc cations that must be removed from the waste stream.

At the present time, metal removal processes include hydroxide and sulfide precipitation, co-precipitation with aluminum, iron or other salts, adsorption on peat or other organic substrates, and ion exchange. Many of these processes, however, are not effective for removal of low or trace concentrations of contaminants, such as zinc, as the practical level of precipitation of a metal cation for these processes is approximately from about 1 to about 2 ppm.

In addition, a process of removal of metal ions from waste water in PCT Application WO 93/16961 requires the presence of a certain amount of calcium or magnesium in the waste water in order to facilitate removal of the metal ions with a fatty acid material. The process further requires additional amounts of calcium or magnesium to be added to the waste water by way of highly soluble salts of calcium or magnesium when the initial concentration of these metals is low. For example, additional calcium is added by way of calcium sulfate when the initial concentration of calcium in the waste water is only 30 ppm because of the need for enough calcium to form a precipitate with the fatty acid material, and to further help coagulate the metal ions for removal. The required initial concentration of calcium for removal of metal ions in the process is preferably 110–150 ppm.

The known techniques for metal removal may also be impractical due to interference from stearate and other components that may be present in waste water from the cooling baths that are used for the manufacture of resins, such as polystyrene. In some situations, the amount of residue or sludge produced by the removal process, such as in calcium-hydroxide precipitation, is prohibitive because of the resulting high equipment and disposal costs and handling problems. The economic cost of these treatment options may also prove to be prohibitive because of the additional costs in chemicals, equipment, and labor required. For example, PCT Application WO 93/16961 requires at least 240 milligrams per liter of sodium oleate to form a precipitate with calcium in order to remove lead ions. This required high level of fatty acid salt reagent increases the costs of production for the process disclosed in the PCT Application.

There thus exists a need for a cost effective metal removal process that may remove low or trace concentrations of contaminants from waste water before discharge to a waste water treatment facility.

A method of removing a metal having a valence of at least one from an aqueous waste stream has now been discovered. The method includes providing an aqueous waste stream containing a metal having a valence of at least one, such as zinc, lead, chromium, copper, iron, aluminum, manganese, cadmium, gold, silver, and mixtures of these metals. The waste stream, however, is substantially free of calcium and magnesium. The process includes forming a substantially insoluble precipitate of the metal by mixing with the waste stream fatty acids; zinc, potassium, and sodium salts of fatty acids; and mixtures of these materials. The metal precipitate is then separated from the waste stream. The water subject to the removal process continues to be substantially free of calcium and magnesium throughout the entire process.

The present invention also provides a method for removing zinc cations from an aqueous waste stream produced by a resin manufacturing process by extruding a resin to form strands of the resin including zinc stearate as a die lubricant. The strands of the resin are immersed and solidified in deionized cooling water and the zinc stearate is carried into the water by the resin. The deionized water is substantially free of calcium and magnesium. The cooling water is then removed as an aqueous waste stream that contains zinc cations. The process also includes forming a substantially insoluble precipitate of the metal by mixing with the waste stream fatty acids; zinc, potassium, and sodium salts of fatty acids; and mixtures of these materials. The metal precipitate is then separated from the waste stream. The water subject to the removal process remains substantially free of calcium and magnesium throughout the entire process.

DETAILED DESCRIPTION

According to the process of the present invention, an aqueous waste stream containing a metal having a valence of at least one is provided. The metal may be monovalent or polyvalent and is to be understood for purposes of this invention to be a metal cation, or alternatively, the metal component of a compound. The metal may be, but is not limited to, zinc, lead, chromium, copper, iron, aluminum, cadmium, manganese, gold, silver, platinum, palladium, molybdenum, cesium, barium, cobalt, vanadium, zirconium, uranium, radium, strontium, arsenic, plutonium, tungsten, tin, bismuth, and mixtures of these metals.

The waste stream, however, is substantially free of calcium and magnesium. Substantially free of calcium used herein as applied to the waste stream in the methods disclosed means that such waste stream contains preferably less than about 30 ppm, most preferably less than about 15 ppm, and still more preferably less than about 10 ppm of calcium. In a highly preferred embodiment, the water that after use becomes the waste stream has been deionized and the calcium is present in trace amounts of less than about 1 ppm. Substantially free of magnesium used herein as applied to the waste stream provided in the methods disclosed means preferably less than about 20 ppm, most preferably less than about 10 ppm, and still more preferably less than about 5 ppm of magnesium. In a highly preferred embodiment, the water that after use becomes the waste stream has been deionized and the magnesium is present in trace amounts of less than 1 ppm.

The water in a polystyrene cooling bath, for example, may be deionized by reverse osmosis or ion exchange prior to its use in the manufacture of polystyrene. Reverse osmosis is a pressure driven process typically used to remove dissolved ionic species from water. This process is employed in the manufacture of polystyrene to remove ionic species from well water, in particular, calcium and magnesium ions. Similarly, ion exchange removes dissolved ionic species from water by employing cationic and anionic resins. Additional methods of deionization may also be employed, such as distillation or evaporation.

The deionized water may be used for the water in cooling baths for resins when a relatively high purity level is desired. Calcium and magnesium are intentionally removed from the water of the cooling baths because the presence of calcium and magnesium would typically interfere with the extrusion and molding of resin products. In addition, the presence or addition of the metal would reduce the optical clarity required in many products made of resins, such as polystyrene drinking glasses. Thus, the presence or addition of calcium or magnesium in the waste water stream of the present invention would not only interfere with production of the desired resin, but would require additional labor and materials to be employed in the process of removal of contaminants from the waste stream. Thus, the treatment of such waste streams is a highly preferred embodiment of the present invention.

The concentration of zinc cations in the waste stream, in particular, is effectively reduced according to the methods disclosed herein. The methods of the present invention are particularly useful in removing even trace amounts of metals, preferably at least about 1 to about 5 ppm, and most preferably up to about 10 ppm, of zinc cations. Prior to mixing the fatty acid material with the waste stream, the waste stream may contain, for example, either or both of zinc cations and zinc stearate, depending on the level of dissociation of the stearate material. Other known metal removal processes, such as zinc hydroxide or zinc sulfide precipitation, may reduce initial metal concentrations of, for example, 10-100 ppm, but are ineffective to remove lower concentrations of contaminants, such as 1 ppm. It is believed that the methods of the present invention may reduce the concentration of metal contaminants, such as zinc, to approximately less than 100 ppb.

In order to form a substantially insoluble precipitate of the metal cations, the metal is mixed in the waste stream with fatty acids; metallic salts of fatty acids, such as zinc, potassium, and sodium salts of fatty acids; or mixtures of these compounds. For purposes of the present invention, substantially insoluble precipitate means a solid material or agglomerated particles containing the metal being removed from the waste stream that can be removed efficaciously and almost completely by filtering or similar means. Without intending to be bound by theory, the methods of the present invention take advantage of the natural insolubility of certain stearate compounds, which can be easily removed from aqueous waste streams by filtration for quick disposal of a compact and non-harmful residue.

The fatty acid material employed in the present invention may be branched or straight chained saturated or unsaturated fatty acids that contain 8–24 carbon atoms, including dimers of these. The fatty acids may be, but are not limited to, stearic acid, oleic acid, linoleic acid, myristic acid, and mixtures of these acids. The fatty acid material may alternatively include metallic salts of fatty acids, for example, without limitation, zinc stearate, sodium stearate, potassium stearate, zinc oleate, potassium oleate, sodium oleate, and mixtures of these salts. Sodium stearate is preferably used in the present invention because it is economical and naturally biodegradable. The material that is added to precipitate the metal is substantially free from calcium and magnesium. It will be appreciated by a person skilled in the art that certain removal materials, especially stearate salts, may contain calcium and/or magnesium impurities, for instance from the manufacturing processes of such materials. Thus, while neither calcium nor magnesium is intentionally introduced at any point of the inventive process, trace amounts may be introduced as impurities of fatty acid salts. A fatty acid material with such trace impurities of calcium and/or magnesium would be considered to substantially free from calcium or magnesium within the scope of the invention.

Because stearate material is sticky and difficult to remove from waste water receptacles, the separation step in a preferred embodiment of the present invention is performed by filtering the precipitate from the aqueous waste stream, although various other techniques, such as settlement and flotation, may also be used in removing the contaminants. The filtration device utilized in the present invention is dependent on the size of the flow stream of the waste water and may be, but is not limited to, a cartridge filter with the appropriate media sizing, a plate and frame filter, or a rotary vacuum filter. The filtration device may be any device commonly applied in water treatment. A preferred embodiment of the present invention additionally includes adding diatomaceous earth as a pre-coat or solution additive to the waste stream before filtering in order to produce a residue useful, for example, in the agricultural industry where zinc is a recognized essential micro nutrient for a number of crops.

While the aqueous waste stream employed in the methods of the present invention is preferably substantially free of calcium and magnesium, the balance of the process should likewise remain substantially free of calcium or magnesium, such that only the initial trace amount of calcium or magnesium present after deionization, or a trace amount resulting from impurities added to the waste stream, remains in the water throughout the entire process.

In yet another preferred embodiment of the present invention, an insignificant or trace amount of calcium or magnesium may be added during the removal process as an impurity in a different material. However, while it will be appreciated from the discussion herein that the presence of calcium and/or magnesium is not only unnecessary for the practice of the present invention, it may in some instances be harmful. Accordingly, no deliberate addition of calcium or magnesium is necessary, and it is preferred that the entire process be conducted with no significant addition of a calcium or magnesium source to the method. No significant addition of a calcium or magnesium source used herein as applied to the present invention means that in one preferred embodiment there is no addition of calcium or magnesium to the waste stream at a level that would affect the efficacy of the method. However, in certain embodiments, minor amounts of calcium and magnesium may be added or may be unintentionally added as an impurity from another agent, as in, for example, sodium stearate, as long as the presence of calcium and magnesium does not interfere with the methods of the present invention.

In another preferred embodiment, the entire process is conducted in a manner where the process or method remains substantially free of calcium and magnesium. By substantially free, as used in connection with the overall method, is meant that the method, as opposed to the initial waste stream, has less than 30 ppm, most preferably less than 15 ppm, and still more preferably less than 10 ppm of calcium and magnesium combined. In a highly preferred embodiment, calcium and magnesium are present in trace amounts of less than 1 ppm.

The method of the present invention may further comprise the step of adjusting the pH of the waste stream to at least about 9, and preferably up to about 10.5, although the present invention may also be employed at a pH of about 7. In addition, the method of the present invention may include a step of adding to the waste stream conventional water treatment polymers, such as cationic, anionic, and nonionic polymers, in order to facilitate the removal process.

The methods of the present invention may also be effective with metal removal from waste streams resulting from the manufacture of various resins, such as styrene-based polymers and copolymers, including, but not limited to, polystyrene, acrylonitrile-butadiene-styrene, styrene-acrylonitrile, styrene-butadiene block copolymer, and the like; polyethylene; polyethylene terephthalate; and mixtures of these resins. In one preferred embodiment of the present invention, a resin is extruded to form strands of the resin including a die lubricant, preferably zinc stearate. The zinc stearate is carried into the waste stream by the resin when the resin is solidified in deionized cooling water that is substantially free of calcium and magnesium. For purposes of the present invention, the zinc present in the waste stream may be either or both zinc metal cations or zinc stearate. A substantially insoluble precipitate of zinc is formed by mixing a fatty acid material in the waste stream, and is subsequently removed from the waste stream by, for example, filtering. The water remains substantially free of calcium and magnesium throughout the entire process.

The present invention may additionally be utilized as a removal process in any waste stream, such as plating baths, that contain polyvalent or monovalent metals, preferably, but not limited to, metals in trace concentrations.

The invention is further described in the following examples. The examples are merely illustrative and do not in any way limit the scope of the invention as described and claimed.

EXAMPLES

EXAMPLE 1

Add 10 mg of sodium stearate to 1 liter of a polystyrene water cooling bath containing about 5 ppm of zinc and about 15 ppm of stearate material. Slowly agitate the water cooling bath for approximately two minutes. Immediately filter the water from the cooling bath using a 0.45 micron filter to remove precipitated zinc and stearate from the bath.

EXAMPLE 2

Add 25 mg of sodium stearate to 1 liter of plating bath rinse water containing about 15 ppm of chromium, 10 ppm of copper, and 12 ppm of nickel. Slowly agitate the rinse water for approximately three minutes. Immediately filter the water using a filter precoated with diatomaceous earth, reducing the concentration levels of the metals in the rinse water.

The invention has been described in detail with reference to preferred embodiments thereof. It should be understood, however, that variations and modifications can be made within the spirit and scope of the invention.

What is claimed is:

1. A method of removing a metal having a valence of at least one from an aqueous waste stream, comprising the steps of:
    a) providing an aqueous waste stream consisting essentially of deionized cooling water through which strands of polystyrene resin have been passed, said aqueous waste stream containing a metal having a valence of at least one, wherein said waste stream is substantially free of calcium and magnesium;
    b) forming a substantially insoluble precipitate of said metal by mixing with said waste stream a material substantially free of calcium and magnesium selected from the group consisting of: fatty acids; zinc, potassium, and sodium salts of fatty acids; and mixtures thereof; and
    c) separating said metal precipitate from said waste stream.

2. The method of claim 1, wherein said metal is selected from the group consisting of zinc, lead, chromium, copper, iron, aluminum, manganese, cadmium, gold, silver, and mixtures thereof.

3. The method of claim 1, wherein said metal is zinc.

4. The method of claim 3, wherein said zinc is introduced into said waste stream as zinc stearate during the manufacture of a resin selected from the group consisting of polystyrene, styrene-based polymers and copolymers, polyethylene, polyethylene terephthalate, and mixtures thereof.

5. The method of claim 1, wherein said waste stream contains about 1 to about 5 ppm of a metal prior to mixing said material in step b) with said waste stream.

6. The method of claim 1, wherein said waste stream contains up to about 10 ppm of a metal prior to mixing said material in step b) with said waste stream.

7. The method of claim 1, further comprising a step of adjusting the pH of said waste stream to from about 9 to about 12.5.

8. The method of claim 1, wherein said material is a fatty acid selected from the group consisting of stearic acid, oleic acid, linoleic acid, myristic acid, and mixtures thereof.

9. The method of claim 1, wherein said precipitate is separated in step c) by filtering with a device selected from the group consisting of a cartridge filter, a plate and frame filter, a rotary vacuum filter, and combinations thereof.

10. The method of claim 9, further comprising a step of adding to said waste stream diatomaceous earth before filtering.

11. A method for removing zinc cations from an aqueous waste stream from a resin manufacturing process, comprising the steps of:
    a) extruding a resin to form resin strands of said resin including zinc stearate as a die lubricant;
    b) immersing said strands of said resin in deionized cooling water that is substantially free of calcium and magnesium, wherein said zinc stearate is carried into said water by said resin;
    c) removing said cooling water as an aqueous waste stream;
    d) forming a substantially insoluble precipitate of said zinc by mixing with said waste stream a material substantially free of calcium and magnesium selected from the group consisting of: fatty acids; zinc, potassium, and sodium salts of fatty acids; and mixtures thereof; and e) separating said zinc precipitate from said waste stream.

12. The method of claim 11, wherein said waste stream contains about 1 to about 5 ppm of zinc prior to mixing said material in step d) with said waste stream.

13. The method of claim 11, wherein said waste stream contains up to about 10 ppm of zinc prior to mixing said material in step d) with said waste stream.

14. The method of claim 11, wherein said precipitate is separated by filtering with a device selected from the group consisting of a cartridge filter, a plate and frame filter, a rotary vacuum filter, and combinations thereof.

15. The method of claim 14, further comprising a step of adding diatomaceous earth to said waste stream before filtering.

16. The method of claim 11, further comprising a step of adjusting the pH of said waste stream to from about 9 to about 12.5.

17. The method of claim 11, wherein said resin is selected from the group consisting of polystyrene, styrene-based polymers and copolymers, polyethylene, polyethylene terephthalate, and mixtures thereof.

18. The method of claim 11, wherein said resin is polystyrene.

* * * * *